United States Patent [19]

Vojacek et al.

[11] Patent Number: 5,143,192
[45] Date of Patent: Sep. 1, 1992

[54] FRICTION CLUTCH OR FRICTION BRAKE

[75] Inventors: Herbert Vojacek, Munich; Hermann Pflaum, Maisach, both of Fed. Rep. of Germany

[73] Assignee: Sinterstahl GmbH, Fussen, Fed. Rep. of Germany

[21] Appl. No.: 693,763

[22] Filed: Apr. 25, 1991

Related U.S. Application Data

[63] Continuation-in-part of Ser. No. 478,045, Feb. 1, 1990, abandoned, which is a continuation of Ser. No. 262,232, Oct. 21, 1988, abandoned, which is a continuation of Ser. No. 83,868, Aug. 7, 1987, abandoned, which is a continuation of Ser. No. 733,477, May 13, 1985, abandoned.

[30] Foreign Application Priority Data

May 14, 1984 [DE] Fed. Rep. of Germany ....... 3417813

[51] Int. Cl.$^5$ .................. F16D 13/60; B23P 25/00
[52] U.S. Cl. .............. 192/107 M; 29/527.2; 192/53 R; 192/53 F; 419/28
[58] Field of Search .............. 192/107 M, 53 R, 53 A, 192/53 C, 53 E, 53 F, 70.15, 107 C, 109 A, 109 B; 188/259; 267/131, 161; 419/8, 28, 29; 428/553, 908.8; 29/149.5 PM, 527.2

[56] References Cited

U.S. PATENT DOCUMENTS

| | | | |
|---|---|---|---|
| 1,802,723 | 4/1931 | Kerruish | 29/149.5 C |
| 1,850,679 | 3/1932 | Leis | 29/149.5 C |
| 2,158,461 | 5/1939 | Koehring et al. | 29/149.5 PM |
| 2,198,253 | 4/1940 | Koehring | 192/107 M |
| 2,299,877 | 10/1942 | Calkins | 419/28 |
| 2,372,203 | 3/1945 | Hensel et al. | 29/149.5 PM |
| 2,395,189 | 2/1946 | Lapsley et al. | 192/53 E X |
| 2,404,808 | 7/1946 | Lowey | 29/149.5 PM |
| 2,793,427 | 5/1957 | Marvin | 419/8 |
| 2,985,273 | 5/1961 | Binder | 192/107 C X |
| 3,153,990 | 10/1964 | Kunzog | 29/149.5 PM |
| 3,365,777 | 1/1968 | MacDonald et al. | 419/8 |
| 3,431,105 | 3/1969 | Heck | 419/8 |
| 3,447,230 | 6/1969 | Bargainnier et al. | 419/28 |
| 3,578,122 | 5/1971 | Magnier | 192/53 F X |
| 3,624,881 | 12/1971 | Brown et al. | 29/149.5 PM |
| 4,002,472 | 1/1977 | LeBrasse et al. | 419/8 |
| 4,069,369 | 1/1978 | Fedor et al. | 419/28 |
| 4,679,681 | 7/1987 | Creyot et al. | 192/53 F |
| 4,770,283 | 9/1988 | Putz et al. | 192/53 F |

FOREIGN PATENT DOCUMENTS

| | | | |
|---|---|---|---|
| 1177891 | 9/1964 | Fed. Rep. of Germany | 192/53 A |
| 1236345 | 3/1967 | Fed. Rep. of Germany | |
| 1251104 | 4/1968 | Fed. Rep. of Germany | |
| 2055345 | 5/1972 | Fed. Rep. of Germany | 192/53 F |
| 2139386 | 11/1976 | Fed. Rep. of Germany | |
| 15043 | 4/1971 | Japan | 192/53 F |
| 195923 | 12/1982 | Japan | 192/53 F |
| 8204295 | 12/1982 | PCT Int'l Appl. | 192/107 M |
| 2033975 | 5/1980 | United Kingdom | 419/8 |
| 2083146 | 3/1982 | United Kingdom | |

OTHER PUBLICATIONS

Roberts and Lapidge, *Manufacturing Processes*, McGraw Hill Book Company, 1977, p. 359 class 29 subclass Digest 11.
"Drawn Shapes From Metal Powders Now Possible" *Materials And Methods*, vol. 40, Jul. 1954, pp. 101–103.
Brochure of Hoerbiger Company describing sprinkled and sintered friction linings with translation.

*Primary Examiner*—Rodney H. Bonck
*Attorney, Agent, or Firm*—Morgan & Finnegan

[57] ABSTRACT

A friction clutch or friction brake is provided having a basic body and a friction body portion. The friction body portion can be mass-produced separately from the basic body, using a planar metal sheet-like material which is treated leading to a sintered powder friction facing. The friction clutch has a non-planar friction surface, operating in a box filled with oil as a lubricant. The friction body is applied to the basis body by form-locking friction, friction-gripping and/or material-locking techiques. In a preferred embodiment, the friction clutch or brake is a synchronizing ring and/or a correcting ring for motor vehicle shift gears.

The friction clutch or friction brake according to the invention has particularly favorable friction properties, a long service life and low manufacturing costs. In a great number of applications, the shaping of separte draining grooves for expelling the oil when the friction grip is produced between matching components can be omitted.

21 Claims, 3 Drawing Sheets

FRICTION CLUTCH OR FRICTION BRAKE

This application is a continuation of Ser. No. 07/478,045, filed Feb. 1, 1990 and now abandoned, which is a continuation of Ser. No. 07/262,232, filed Oct. 21, 1988 and now abandoned, which is a continuation of Ser. No. 07/083,868, filed Aug. 7, 1987 and a now abandoned, which is a continuation of Ser. No. 06/733,477, filed May 13, 1985 and now abandoned.

BACKGROUND OF THE INVENTION

The present invention relates to a friction clutch or friction brake having lubricated friction surfaces and components thereof. The invention further relates to friction clutches or brakes that are non-planar, preferably conical. In particular, the invention relates to a synchronizing ring and/or correcting ring for motor vehicle gear-shift mechanisms, consisting of a basic body made of a basic material and a friction body applied or attached to said basic body at least to partial zones thereof in a form-locking, friction-gripping and/or material-locking way.

The extensive field of friction clutches and friction brakes can be divided into different types, based on the various designs, type of friction pairings, lubrication, and the way the mechanism of switching forces works. With respect to the design of the friction surfaces, a distinction can be made between jaw clutches, cone clutches and disk clutches. Depending on the type of friction pairing and lubrication, a distinction is also made between dry-running and lubricated friction surfaces, with and without a special friction facing. Particularly with friction facings which are oil lubricated, the type of handling or control and the switching force are of great importance. During the switching action, the oil has to be forced out from between the friction surfaces in order to achieve friction grip with high coefficients of friction. If pneumatic or hydraulic servomotors are available for this purpose, high switching forces can be readily produced, which expel the oil from between the pairs of friction surfaces. This is different with manually shifted friction clutches or friction brakes such as, for example, manually shifted synchronized gears in motor vehicles, where one is faced with the problem that the friction surfaces float on each other so that oil may be expelled from between the friction surfaces too slowly, with the result that the switching time is undesirably long or, in the extreme case, that the synchronizing system fails to function properly.

The switching or braking properties of friction clutches or friction brakes are determined mainly by the friction characteristics of the friction pairings and the size of the actually acting friction surface. The actually acting friction surface is the portion of the geometric friction surface which, when engaged, is in actual friction grip with the partner surface. Friction surfaces have a more or less structured configuration, which reduces the actually effective or acting friction surface. Lubricated friction surfaces have draining grooves, channels or furrows in the friction surface for removing the oil when the friction grip is produced between the surfaces of the paired friction facings. Such grooves where indispensable until now, at least with manually shifted friction clutches and friction brakes, and required a reduction of the actually acting friction surface by 30 to 80% of the geometric friction surface.

Particularly with respect to non-planar paired friction surfaces, the shape of the one friction partner may be different from the shape of the surface of the other partner due to tolerances in the manufacture, or due to deformation under frictional pressure, so that the actually acting friction surface is often substantially reduced as compared to the geometric friction surface.

Friction surfaces are subjected to high shearing stresses and thermal loads, and to frictional wear that increases with temperature. To keep such wear low, the actually acting and, consequently, the geometric frictional surfaces should be as large as possible. The high requirements with respect to resistance to wear make it necessary to manufacture the friction facing from high-quality, expensive materials. However, for reasons of material savings, and thus cost savings, the frictional surfaces are designed with sizes as small as possible. Highly stressed modern friction couplings and friction brakes are mainly produced with shaped parts or components made of basic materials such as steel, brass and various bronzes, to which specific friction facings are applied by a variety of methods.

German patent DE 31 22 522 A1, for example, describes a synchronizing device for form-locking gear-shift clutches in which the synchronizing ring and/or correcting ring is made of metal and the friction facing is made of a ceramic material, whereby the ceramic material is both the supporting element and the material of the friction surface which is combined with the synchronizing ring and/or correcting ring by form-locking, friction-locking or material-locking. Alternatively, the ceramic material is applied to the latter in pulverized powder form by sputtering. The friction facing is manufactured according to this device from oxide and/or silicide and/or boride and/or carbide and/or nitride and/or titanium oxide.

However, a number of the problems discussed above occur if synchronizing rings and correcting rings according to the above patent are not modified. The materials used for the friction facing according to DE 31 22 522 are particularly expensive mainly if said facings are designed as self-supporting shaped bodies. Moreover, draining grooves cannot be dispensed in this apparatus, as a result the actually acting friction surface is reduced in size and the geometric friction surface must therefore be larger and thus more costly. The friction facing of the German patent is applied by sputtering, which is also costly. Moreover, as a rule, only one surface of the paired friction surfaces is coated with said highly abrasively acting friction body, the uncoated counter surface of the German patent is subjected to above-average wear. Furthermore, said design poses special problems with respect to heating of the coating, dissipation of the heat and adhesion of the friction facing.

In another known design for a synchronizing ring according to German patent DE 27 44 994, said ring is made of a metallic basic body and a glued friction body thereon. The friction body is paper based and has a number of organic friction materials impregnated therein with synthetic resin.

Such friction facings can be produced at relatively favorable costs; however, only low, frictional compression is permitted due to the low strength of such surfaces. Consequently, relatively large geometric friction surfaces are needed for the synchronizing rings, which means that such rings have to be large and, consequently, expensive. Large dimensions, however, are often not possible because of available design space limitations. Also according to this design, when the grip is produced, the film of oil can only be removed slowly from the large friction surfaces, resulting in a long duration of the synchronizing action. Furthermore, the friction characteristics are changed because the lubricated oil is decomposed at the high temperature experienced using this design. Consequently carbon from the decomposed oil is collected and embedded in the surfaces of the design, due to the cracking of the oil at high friction temperatures, leading to failure of the synchronizing device.

German utility patent No. 73 42 680 describes a synchronizing ring made of sintered steel, to which there is applied a thin coating of molybdenum within the zone of the friction surface. Molybdenum powdered material is expensive. As a rule, it has to be compacted further after it has been applied to the ring. In another manufacturing step, the device has to be provided with draining grooves, which means that such synchronizing rings are very costly. The coating so applied has a relatively high degree of roughness, which means that the actually acting friction surface is comparatively small. In practical applications, this means that the friction surface is excessively heated locally, resulting in corrosion of the synchronizing ring and correcting ring and detachment of the molybdenum coating and, in turn, substantial functional problems with the clutch.

The present invention, therefore, is directed to the problem of designing and producing friction clutches or friction brakes of the type specified above in such a way that their manufacture is possible at low cost while permitting a high degree of exploitation of the geometric friction surface, a long service life, high frictional overloads for brief periods and only minor premature failures with the above-mentioned drawbacks of the known designs substantially reduced or eliminated.

SUMMARY OF THE INVENTION

According to the invention, these problems are solved by providing a separately produced friction body which has a sintered friction facing having as a substrate a supporting piece of sheet metal with material properties similar to those of the basic material, to which a friction material is applied in the form of a powder by sprinkling and sintering. The friction material is compacted or densified by pressing or drawing the friction body once or several times.

In a further embodiment of the invention a friction clutch or brake plate is a synchronizing ring and/or a correcting ring comprising a basic body, and a friction body. The basic body and the friction body are linked together along a conical surface to provide good mechanical stability. One way this is achieved is by form locking where the basic body and the friction body have corresponding surfaces that are identical when small tolerances so that when they are pressed together stability is achieved. Another way is by friction locking where friction gripping occurs between at least small areas of corresponding surfaces of the basic body and the portion body when they are linked together. Alternatively, both parts are linked together by soldering, or welding e.g. material locking. The friction body is comprised of a sintered powder friction facing and a supporting metal sheet substrate comprised of a material having properties similar to those of the basic material. The friction facing or layer of the friction body is formed by sprinkling and sintering powder onto the substrate and pressing the powder thereon at least one time.

In a further embodiment of the invention, a friction body with a friction layer formed by sprinkling powder and sintering is provided. The sintered powder friction facing is disposed on a carrier metal sheet and is compacted by pressing the friction body at least one time. The friction body can be used with a friction clutch or brake having inner and outer annular friction surfaces which are lubricated and non-planar, preferably conical in shape.

DESCRIPTION OF THE DRAWING

The invention and its advantages are described in greater detail in the following with the help of the drawing, in which.

DETAILED DESCRIPTION OF THE INVENTION

The sintered friction body of the invention can be produced industrially from, and in the form of, planar or flat disks or lamellas only in order to achieve the respective friction properties and thus at favorable manufacturing cost. In the production process, a powder consisting of various components is applied to a flat or planar carrier material in exact doses or amounts and is then sintered, compressed, densified, pressure-sintered, and brushed in a number of manufacturing steps. Generally it is compacted to exactly the desired thickness of the coating in the final production step. If need be, grooves or small ducts can be made in the surface of the facing by pressing in the course of the compressing step or steps without the need for cutting or machining notches after compaction and without facing the hazard of cracking, which frequently occurs when such grooves are made by means of cutting or machining methods.

Such sintered friction facing powders are widely used in various fields of application because of their favorable properties, such as good wet running and dry emergency running behavior, high thermal loadability, compatibility at high pressure and high sliding rates as well as long service life. Tested fields of application includes brakes, shiftable locking differentials, clutches or coupling for machine tools, and friction disks in vibration dampers.

It has been surprisingly discovered that flat, sintered powder friction facings can be reworked to produce non planar friction facings, without the friction facing losing friction and wear properties. Furthermore, it is a special feature of the invention of that material sintered onto the supporting body will not peel or chip off in the course of the manufacturing process or when in later use. The products can withstand high pressing forces without problems. Until now the frictional properties of sintered friction bodies according to the invention have not been considered suited for friction clutches and brakes like synchronizing rings, having a lubricatd, uneven friction surface. Notwithstanding, the processing, bending, shaping and/or drawing of the friction bodies, separately produced as planar friction bodies, according to the invention—which method is known per se—this gave satisfactory results and provided properties and advantages for clutches and brakes superior to the known state of the art for devices with respect to such properties as: coefficient of friction, useful life, large actually acting friction surface, capability of oil displacement, manufacturing costs and price. The test results disclosed hereinafter demonstrate the technical progress of the present invention.

According to a preferred feature of the invention, the sintered friction body produced in the form of a plane metal sheet is provided with the shape desired for the friction surface.

Figure 1:
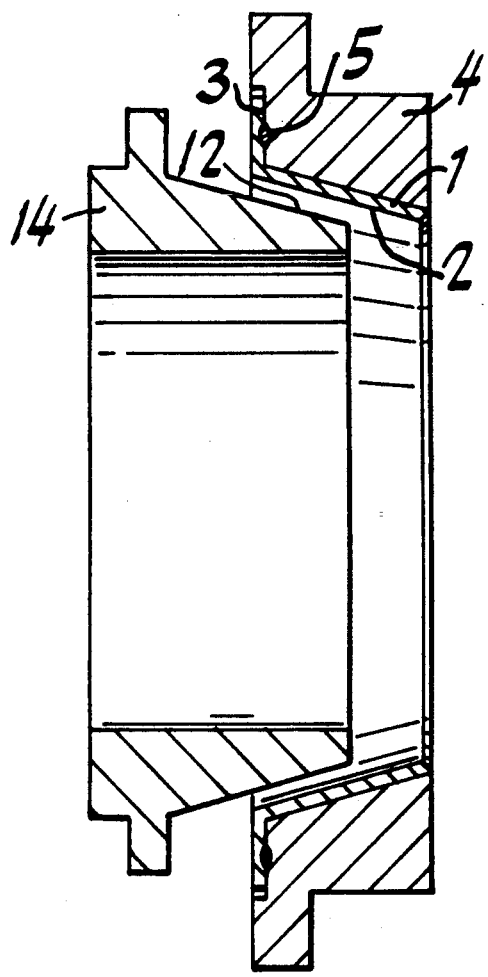
FIG. 1 shows a friction clutch according to the invention.
Figure 2:
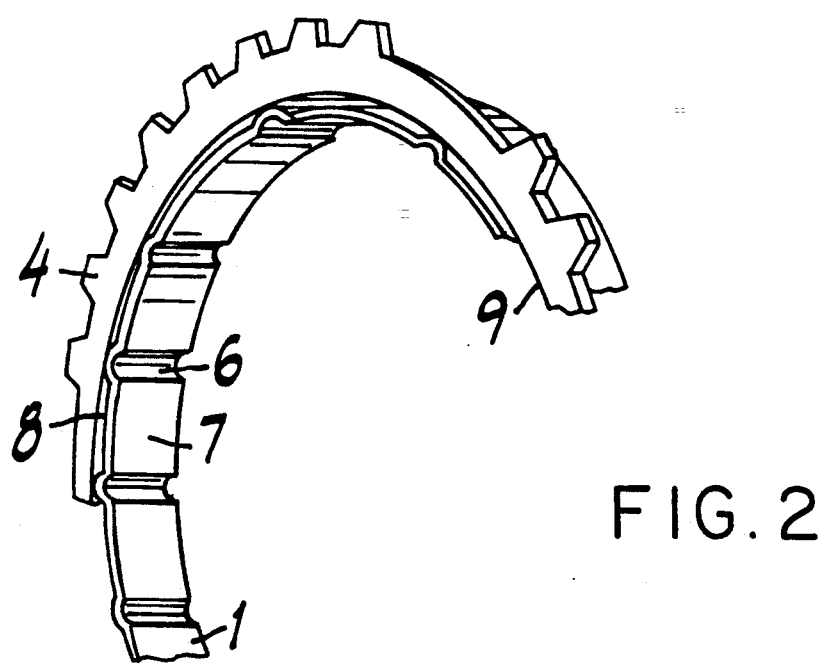
FIG. 2 shows a three-quarter view of a synchronizing ring and friction body of another advantageous embodiment of the invention.

As can be seen in FIGS. 1-2, in one preferable embodiment, this friction body is shaped like a truncated, hollow cone, the inner surface of which is parallel to the outer surface. One of the novel features of the present invention is that this friction body is a continuous structure unbroken by any gaps. In a further embodiment of the invention this friction body can be continuous, without any joints such as welds or adhesive bonds. Because the friction body is formed in a single piece without any gaps around its circumference, the friction body offers greater durability and exhibits smoother running behavior. A ring without any joints is especially durable. These gaps or joints are especially undesirable because they are sites where delamination of the sintered friction layer from the underlying substrate typically occurs.

Preferably, a steel sheet usable for mechanical drawing to a desired shape, is used as the carrier sheet for supporting the sintered powder friction facing.

Notwithstanding, to the reworking or reshaping of the —originally planar of flat—friction facing by means of drawing to obtain the desired non-planar shape, the friction facing is provided with a surface structure which eliminates for a great number of applications the need for the additional shaping of draining grooves for expelling oil. This applied in particular in cases in which lubricating oils with a viscosity of up to 2500 mm$^2$/s are used, i.e., to conventional transmission oils at temperatures starting at about $-10°$ C.

The basic body and the friction body can be combined with each other in a material-locked way by means of spot welding or rolled-seam welding through the friction body.

According to another preferred embodiment of the friction clutch or friction brake of the invention, the friction body has a collar not used as the friction surface, whereby the friction body is secured on the basic body within the zone of the collar by soldering or welding (see FIG. 1). This design permits a simple welded connection between the basic body and the friction body by producing a closed or sealed welded seam within the zone of the collar.

According to another preferred embodiment of the friction clutch or friction brake of the invention, the basic body is made of sintered steel.

Advantageously, the friction material of the friction body is composed of metallic and nonmetallic inorganic materials.

According to another embodiment of the invention, the friction body is applied to the basic body in a form-, friction .nd/or material-locked manner only within partial zones of the basic body, disregarding greater tolerances of dimensions. When the friction clutch is in use, the friction body is connected with the basic body in a form-locked way at least approximately with its total contact area under the contact pressure of the counter surface due to its elasticity. This design permits greater manufacturing tolerances and thus a design that is favorable. It also assures approximately uniform geometric and actual acting friction surfaces, in addition to other factors.

According to yet another preferred embodiment of the friction clutch or brake of the invention, only one of the two friction surfaces of a pair of friction facings is provided with a sintered powder friction body, whereas the other or counter surface preferably is made of hardened steel.

Because of the above-mentioned properties of the friction clutch or brake of the invention, the cluth or brake is advantageously used in manually handled shift gearings without necessarily the use of a servomotor, or power amplifier. Surprisingly, this applies also to a preferred design, i.e., a design wherein the friction body is not provided with any additional draining grooves for displacing oil. The friction body is provided with the desired structure during its manufacture.

DESCRIPTION OF THE PREFERRED EMBODIMENT

The sectional view of FIG. 1 shows—in a simplified manner—a synchronizing ring 4 and an associated correcting ring 14. The cone-shaped friction surface 2 of the synchronizing ring and the friction surface 12 of the correcting ring are spaced apart in the drawing, i.e. they are not in a frictional grip. The friction body 1 having a sintered friction facing is mounted as shown in FIG. 1 according to a preferred embodiment of the invention. The friction body has a collar 3 not used as a friction surface which is used to attach the basic body in a material-locked manner, e.g. by an annular welded seam 5.

FIG. 2 shows a three-quarter view of a synchronizing ring 4. The friction body 1 is attached to the cone-shaped friction surface 9. According to a perferred embodiment of the invention, said friction body 1 was preformed before it was applied in a way such that it rests on the basis body along individual, strip-like surface section 6, and it is combined with the basic body within said zones in a material-locked manner, for example by spot welding. Due to the crimps or folds in the friction body, the remaining surface 7 of the friction body is not resting on the basic body, but arranged with a gap-like spacing 8 from said body, said spacing having an approximately constant width.

One advantage of said preferred embodiment is that the friction surface of the synchronizing ring is not resting on the basic body and is capable of fully contacting the matching surface or friction facing of the correcting ring due to its elasticity. In this way, the dimensional inaccuracies of the cone-shaped friction bodies have no bearing on the support, and changes in the shape of the friction surface due to pressure and temperature loads can be compensated for without any effect on the actually acting friction surface. Furthermore said design reduces the hazard of the occurrence of friction vibrations.

In the following, the technical superiority of the friction clutches according to the invention over conventional designs is shown with the help of a number of tests.

In a first test, a test arrangement closely in conformity with practical applications was used to determine the coefficient of friction $\mu$ as the function of a number of revolutions n, once for a friction body according to the invention with a coated-cone like surface, and, on the other hand, for a friction body made of brass (48% copper, 40% zinc, 2% aluminium) with a geometric friction surface of the same size. In this case, $\mu$ is a mean value of the coefficient of friction, in each, based on four tests, in which pressing forces of 50, 100, 200 and 400N were used. The number of revolutions n is measured in rpm's, with 1000 rpm approximately conforming to a sliding speed of 2.9 m/s.

The cones tested had an average diameter of $d_m = 55$ mm; the width of the surface of the cone is up to 10 mm. While the friction body according to the invention did not have any grooves for expelling the oil, the brass ring (series-produced synchronizing ring) has axial grooves and a V-shaped thread for displacing the oil. For the tests, a friction cone made of a manganium-chrome-iron-steel and with a surface roughness of $R_a/R_z = 0.15/1.4$ $\mu$m was available as the counter friction surface.

Figure 3:
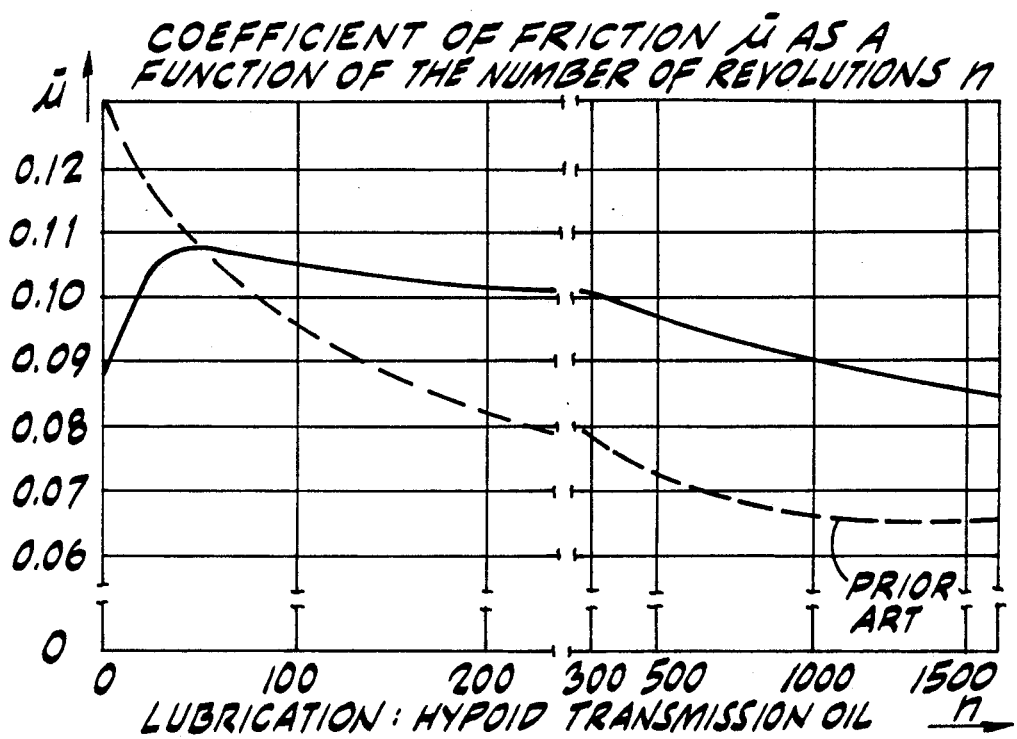
FIGS. 3 to 5 show the coefficient of friction of friction clutches as a function of the number of revolutions or sliding rate with the use of three different transmission oil grades, in each a friction clutch according to the invention is compared with a conventional mass-produced friction clutch made of brass.
Figure 4:
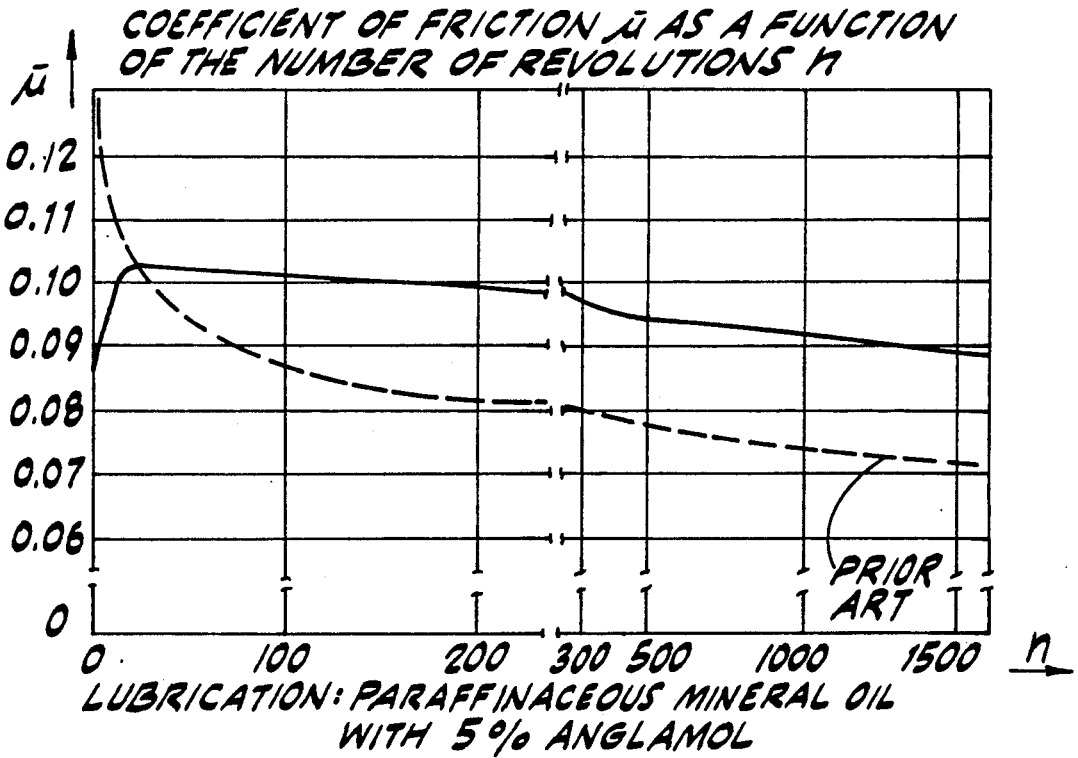
Figure 5:
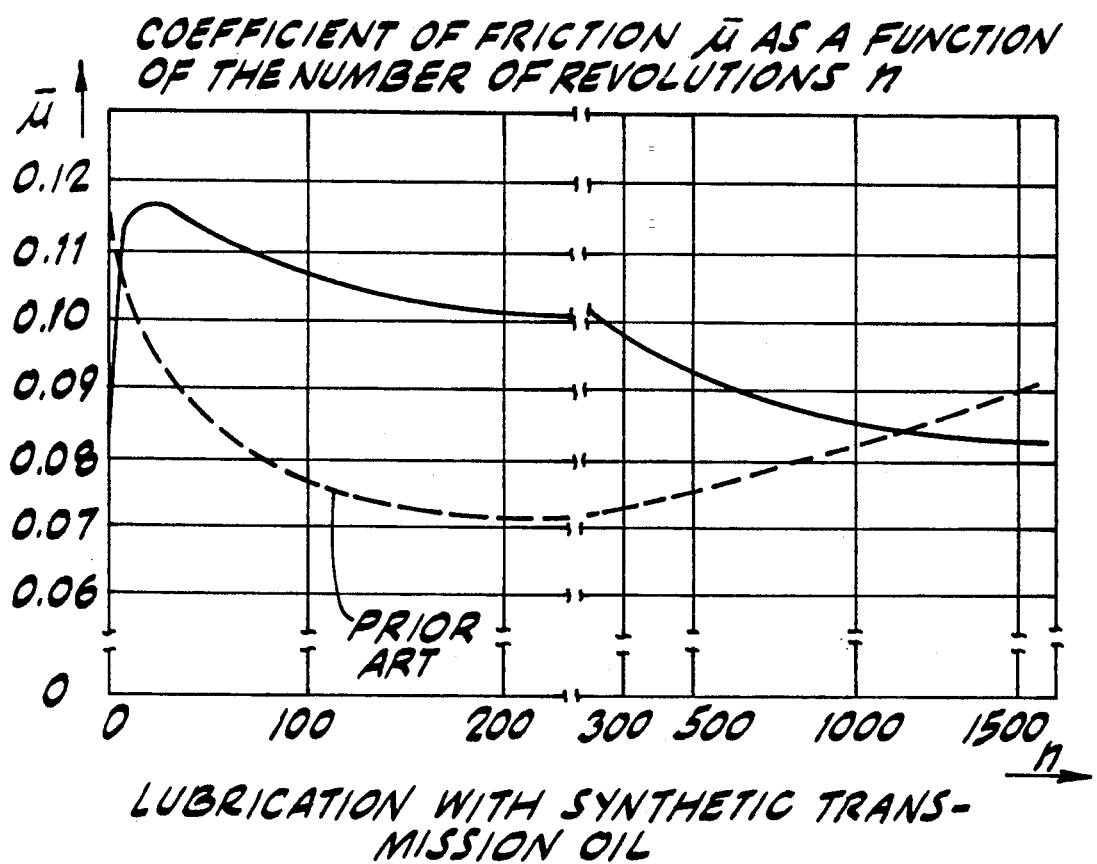

The test results as shown in FIGS. 3 to 5; the test series are characterized in that different transmission oils were used. FIG. 3 shows the measured values obtained with the use of a hypoid transmission oil, FIG. 5 shows a synthetic transmission oil, and FIG. 4 those obtained with the use of paraffinaceous mineral oil with 5% Anglamol. The measurement values shown in the figures were measured in each cast at a constant number of revolutions during a load period of 1-2 seconds.

In all three test series (FIGS. 3 to 5), the sliding friction is significantly higher for a friction body according to the invention as compared to the known design, at least within the range of rmp's that are of interest. According to the invention, therefore, a defined moment of friction can be produced at a significantly lower pressing or contact force as compared to known designs, to an extent that was not foreseeable. In practical applications, this means that a friction clutch, for example a synchronizing ring, permits a shorter duration of the synchronizing action and thus quicker gear shifts while the frictional work is reduced at the same time. As compared to known designs, it is a second significant advantage of the solution according to the invention that the static friction is clearly reduced with the design of the invention, which permits a wear-reducing transition from the relative motion to the synchronous motion of the components of a friction clutch, which increases the shifting comfort and permits a very smooth shifting of the gears.

In order to further demonstrate the superiority of a synchronizing ring according to the present invention as compared to the known designs, various synchronizing rings were tested in a clutch simulator practically producing the conditions found in a commercial vehicle, particularly with respect to: shifting force, increase in shifting force, friction work, frictional performance, number of revolutions and lubrication.

Synchronizing rings (diameter = 108 mm) with a cone-shaped friction surface 10 mm wide were tested. In the comparative tests, the following were tested: A synchronizing ring with a friction body according to the invention, a brass ring and a synchronizing ring made of sintered steel having a sprayed and compacted molybdenum friction facing.

With commercial vehicles, one can assume that the nominal frictional work on the synchronizing ring is about 1.5 to 2 kJ (kilo joules) when the clutch is at the operating temperature. However, under unfavorable conditions such as cold temperatures, poor shifting or a shifting clutch which does not assure complete separation, the frictional work can increase shapely. In a great number of simulated clutching actions, it was found that a synchronizing ring having a ring friction facing made of sintered power exhibits a practically unchanging friction and wear behavior even when the frictional work is to 7.5 kJ. On the other hand, a synchronizing ring made of brass, at frictional work loads of 4 kJ and higher, exhibits a coefficient of static friction which rises abruptly in relation to the number of clutching actions and, therefore, a highly unfavorable change in the friction and wear behavior results. When the frictional work is to 5 kJ and higher, synchronizing rings made of sintered steel having a Mo-coating tend to exhibit the highly undesirable seizing between the pair of friction partners which impairs proper performance of the equipment.

Sintered powder friction bodies applied to synchronizing rings are also significantly superior to brass rings with respect to endurance strength and are even slightly superior to sintered steel rings made of Mo-facings. Advantageously, the material of the invention can be manufactured at a substantially lower cost.

At a stationary frictional load of 100N pressing force and at 500 rpm for one hour of load duration, the brass ring with the aforementioned dimension, exhibited in the aforedescribed test arrangement, a material loss of 2 to 8 mg; the sintered steel ring with the Mo-facing showed a material loss of 1 to 4 mg, whereas the sintered powder facing of the invention has a material loss that is not measureable.

In all test series, the synchronizing ring according to the present application consisted of a basis body made of sintered steel, to which a commercial sintered powder friction body of type HS 43 t (a commercially available powder) was applied and which was spot welded through the friction body.

What is claimed is:

1. A method for making a friction body for use in a friction clutch or a friction brake having a fluid-lubricated, curved surface which comprises the steps of:
   providing a flat metal sheet substrate;
   sprinkling a powdered friction material on the substrate;
   sintering the sprinkled friction material on the substrate;
   compressing the sintered friction material on the substrate at least one time and;
   drawing the flat substrate with the compressed friction material thereon to form the curved friction body.

2. The method of claim 1, wherein the substrate is steel and wherein the friction material is a powdered mixture comprising a metallic friction material and a non-metallic inorganic friction material.

3. The method of claim 1, wherein the friction body is a synchronizing ring of an automative transmission.

4. The method of claim 1, wherein at least one groove is formed in the sintered friction material during the compressing.

5. A method for making a synchronizing ring for use in an automotive transmission having a fluid-lubricated, curved surface, which comprises the steps of:

(a) providing a flat metal sheet substrate having opposite planar surfaces;
(b) applying a layer of a powdered friction material onto at least one of the planar surfaces of the substrate, the friction material comprising a metallic friction material and a non-metallic inorganic friction material;
(c) sintering the sprinkled friction material on the substrate;
(d) compressing the sintered friction material on the substrate; and
(e) reshaping the flat substrate with the compressed friction material thereon into the curved synchronizing ring; characterized in that the compressed friction material on the curved synchronizing ring is capable of exhibiting practically unchanging friction and wear behavior during use.

6. The method of claim 5, wherein at least one groove is formed in the sintered friction material during the compressing step.

7. The method of claim 5, wherein the reshaping is carried out by drawing.

8. The method of claim 5, wherein the reshaping is carried out by bending.

9. The method of claim 5, wherein the substrate is reshaped into the form of a truncated cone.

10. The method of claim 5, wherein the friction material is applied to both planar surfaces.

11. The method of claim 5, wherein the automobile transmission is a manual transmission.

12. A friction ring for use in fluid-lubricated clutches, brakes and synchronizing equipment, the friction ring comprising:
a curved metal sheet substrate which is continuous without any joints and having an inner surface and an outer surface; and
a layer of sprinkled, sintered, and thereafter compressed friction material bonded onto at least one surface of the substrate, the friction ring being formed by reshaping a flat metal sheet substrate having the sprinkled, sintered, and compressed friction material bonded thereto.

13. The friction ring of claim 12, wherein the substrate is steel and wherein the friction material comprises a powdered mixture of a metallic friction material and an inorganic friction material.

14. A synchronizing ring for use in clutches, brakes and synchronizing equipment having fluid-lubricated, curved surfaces, the synchronizing ring having a friction facing capable of exhibiting practically unchanging friction and wear behavior during use, the ring comprising a curved metal sheet substrate having an inner surface and an outer surface and, as the friction facing, a layer of a sprinkled, sintered, and thereafter compressed friction material bonded onto at least one surface of the metal sheet substrate, the friction material comprising a powdered mixture of a metallic friction material and a non-metallic inorganic friction material.

15. The synchronizing ring of claim 14, wherein the substrate is steel.

16. The synchronizing ring of claim 14, wherein the friction facing has at least one groove in its surface.

17. The synchronizing ring of claim 14, wherein the ring is continuous without any gaps.

18. The synchronizing ring of claim 14, wherein the ring is continuous without any joints.

19. The synchronizing ring of claim 14, wherein the ring is shaped like a truncated cone.

20. The synchronizing ring of claim 14, wherein the friction material is bonded to both the inner and outer surface of the substrate.

21. A synchronizing ring for use in a fluid-lubricated automotive friction clutch or friction brake, the friction clutch or friction brake having a first body having a control outer surface, the first body being rotatably mounted for rotation about a first axis, a second body having a conical inner surface, the second body being rotatably mounted for rotation about a second axis, the first and second axes being coincident, one of the first and second bodies further being mounted so that it can be reciprocally moved parallel to the axes, the synchronizing ring being disposed between the first and second bodies so that when the reciprocally mounted body is moved toward the outer body the synchronizing ring engages both bodies, wherein for the improvement the synchronizing ring comprises:
a curved metallic element which is continuous without any joints and which has an inner and an outer face approximately parallel to each other;
a layer of sprinkled, sintered, and subsequently compressed friction material bonded onto at least one face of the metallic element.

* * * * *

UNITED STATES PATENT AND TRADEMARK OFFICE
CERTIFICATE OF CORRECTION

PATENT NO. : 5,143,192
DATED : September 1, 1992
INVENTOR(S) : Herbert Vojacek, et al.

It is certified that error appears in the above-identified patent and that said Letters Patent is hereby corrected as shown below:

Col. 10, claim 21, line 29, change "control" to conical

Signed and Sealed this

Fourteenth Day of September, 1993

Attest:

BRUCE LEHMAN

*Attesting Officer*    *Commissioner of Patents and Trademarks*